United States Patent [19]

Rodler, Jr.

[11] Patent Number: 4,520,691
[45] Date of Patent: Jun. 4, 1985

[54] HYDROSTATIC REACTION TRANSMISSION

[75] Inventor: Waldo E. Rodler, Jr., San Jose, Calif.

[73] Assignee: FMC Corporation, Chicago, Ill.

[21] Appl. No.: 599,430

[22] Filed: Apr. 12, 1984

Related U.S. Application Data

[62] Division of Ser. No. 320,256, Nov. 12, 1981, Pat. No. 4,464,973.

[51] Int. Cl.³ .............. F16H 3/44; F16H 1/28; F16D 57/02
[52] U.S. Cl. .................... 74/790; 74/802; 74/793; 188/296
[58] Field of Search .......... 74/790, 792, 789, 774, 74/778, 782, 786, 802, 793; 188/296

[56] References Cited

U.S. PATENT DOCUMENTS

| | | | |
|---|---|---|---|
| 2,343,509 | 3/1944 | Jandasek | 74/782 |
| 2,376,699 | 5/1945 | Jandasek | 74/782 X |
| 2,448,249 | 8/1948 | Bonham | 74/792 X |
| 2,572,310 | 10/1952 | Brown | 74/792 X |
| 2,581,886 | 1/1952 | Rockwell | 74/782 |
| 2,608,884 | 9/1952 | Orner | 74/774 X |
| 2,618,175 | 11/1952 | Bruce | 188/296 X |
| 2,995,049 | 8/1961 | Bolliger | 74/790 X |
| 3,146,630 | 9/1964 | Ivey | 188/296 X |
| 3,199,376 | 8/1965 | De Lalio | 74/720.5 |
| 3,351,168 | 11/1967 | Thorpe | 74/774 |
| 3,369,419 | 2/1968 | Henstrom et al. | 74/720.5 |
| 3,370,663 | 2/1968 | Henstrom et al. | 180/6.44 |
| 3,371,734 | 3/1968 | Zaunberger et al. | 180/6.44 |
| 3,373,636 | 3/1968 | Livezey et al. | 74/720.5 |
| 3,374,692 | 3/1968 | Kitch et al. | 74/792 |
| 3,383,953 | 5/1968 | Christenson | 74/720.5 |
| 3,524,523 | 8/1970 | Klimax et al. | 188/296 X |
| 3,583,256 | 6/1971 | Livezey | 74/720.5 |
| 3,590,658 | 7/1971 | Tuck | 74/687 |
| 3,592,077 | 7/1971 | Polak | 74/687 |
| 3,596,535 | 8/1971 | Polak | 74/720.5 |
| 3,899,941 | 8/1975 | Cook | 74/782 X |
| 3,931,870 | 1/1976 | Memmer | 188/296 |
| 4,183,265 | 1/1980 | Pauley | 74/786 |
| 4,280,579 | 7/1981 | Zaunberger et al. | 180/6.44 |
| 4,421,213 | 12/1983 | Brosius et al. | 188/296 |

FOREIGN PATENT DOCUMENTS

| | | | |
|---|---|---|---|
| 634030 | 10/1934 | Fed. Rep. of Germany | 74/789 |
| 1192965 | 10/1959 | France | 74/790 |

OTHER PUBLICATIONS

Interavia., vol. 20, No. 12, 1965 (Reprinted in International Defense Review, Specific Series:—The Swedish "S" Tank).

Primary Examiner—Allan D. Herrmann
Assistant Examiner—Stephen B. Andrews
Attorney, Agent, or Firm—A. J. Moore; H. M. Stanley; R. B. Megley

[57] ABSTRACT

A reaction differential is disclosed which is preferably used in a hydrostatic steering differential for accurately steering a casemate vehicle at very low speeds for precise aiming of a gun which is aimed in azimuth by steering. The reaction differential is driven in selected direction by a hydrostatic motor only after the motor is rotated at an rpm which will provide smooth motor performance before sufficient torque is provided to initiate steering of the vehicle.

1 Claim, 11 Drawing Figures

FIG_1

FIG_3

FIG_4

FIG_5

HYDROSTATIC REACTION TRANSMISSION

This application is a division of application Ser. No. 320,256, filed Nov. 12, 1981 which issued as U.S. Pat. No. 4,464,973 on Aug. 14, 1984.

BACKGROUND OF THE INVENTION

1. Field of the Invention

The present invention relates to a reaction transmission, and more particularly relates to a reaction steering mechanism providing precise steering for mobile vehicles such as track-laying or wheel supported vehicles wherein precision steering is required in a range from very low to high steering rates.

2. Description of the Prior Art

It is broadly old in the art to provide steering transmissions with continuous variable hydrostatic control and infinitely variable speed ratio control for tracked or wheeled vehicles. U.S. Pat. Nos. 3,199,376; 3,371,734; and 3,373,636 are representative of patents which disclose such transmissions.

It is also broadly old in the art to provide a hydrostatic control in a transmission for steering track-laying vehicles for the purpose of aiming a gun secured to the vehicle and maintained parallel with the longitudinal axis of the vehicle. United States Henstrom et al U.S. Pat. Nos. 3,369,419 and 3,370,663 disclose such systems.

SUMMARY OF THE INVENTION

The reaction transmission of the present invention includes a reaction steering differential that is preferably inserted as a unit in a well known vehicle steering and propulsion transmission to provide smooth and accurate steering speeds throughout a predetermined steering speed range with minimum speeds being substantially less than 0.5 mil per second. The preferred use of the reaction transmission is with a wheeled or track-laying casemate military vehicle, i.e., a vehicle wherein a gun on the vehicle is aimed in azimuth by steering the vehicle. When the gun is to be trained at long range on a moving target, the forward speed of the vehicle is preferably stopped and the reaction steering transmission pivots the vehicle about a generally vertical axis.

When operating the vehicle at normal speeds, the hydrostatic reaction steering transmission provides; precision high speed steering control for highway travel, smooth steering control without jerking or roughness, and also isolates the hydrostatic system from road shock.

The hydrostatic reaction steering transmission includes an adjustable swash plate pump and a fixed swash plate motor having imprecise operating characteristics at operating speeds below about 40 rpm. The several embodiments of the reaction steering differential provide a speed correction or null in the slow speed range of the hydrostatic motor so that steering does not occur until the swash plate motor speeds are above about 40 rpm. The differential also provides for no load starting of the hydrostatic swash plate motor and additionally provides for soft stops.

DESCRIPTION OF THE PREFERRED EMBODIMENT

Figure 1:
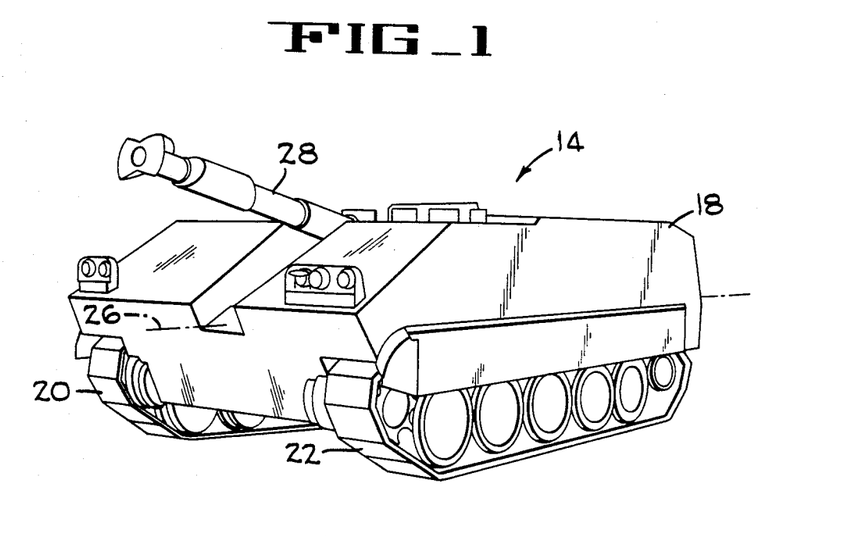
FIG. 1 is a perspective of a track-laying casemate vehicle illustrating the preferred type of vehicle in which the reaction steering mechanism of the present invention is employed.

The preferred embodiment of the reaction differential 10 (FIGS. 2 and 3) of the present invention is intended for use in a hydrostatic transmission 12 (FIG. 4) in a track-laying casemate military vehicle 14 of the general type illustrated in FIG. 1. The vehicle 14 includes a chassis 18 supported by ground engaging elements illustrated as tracks 20,22 and powered by an engine 24 (FIG. 4) through the transmission 12. The longitudinal axis 26 of the chassis 18 is parallel to the axis of the tracks, and is also parallel to the axis of a gun 28 which is carried by the vehicle.

As used herein, the term "casemate vehicle" means that the gun 28 does not pivot in azimuth relative to the chassis 18 but is secured to the chassis 18 of the vehicle requiring that the vehicle be turned to traverse the gun horizontally. Elevation of the gun 28 may be varied in a conventional way either by pivoting the gun relative to the chassis 18 by power means (not shown), or by pivoting the chassis about an axis transverse to the longitudinal axis 26 of the chassis which is parallel to the axis of the gun 28. It is apparent therefore that gun laying, i.e., traversing in azimuth or in a plane substantially parallel to the ground, is achieved by steering the vehicle. It is also apparent that sighting a distant stationary target or a distant moving target requires very precise steering control at low steering speeds to accurately control the aim or swing of the gun 28 in azimuth.

Figure 4:
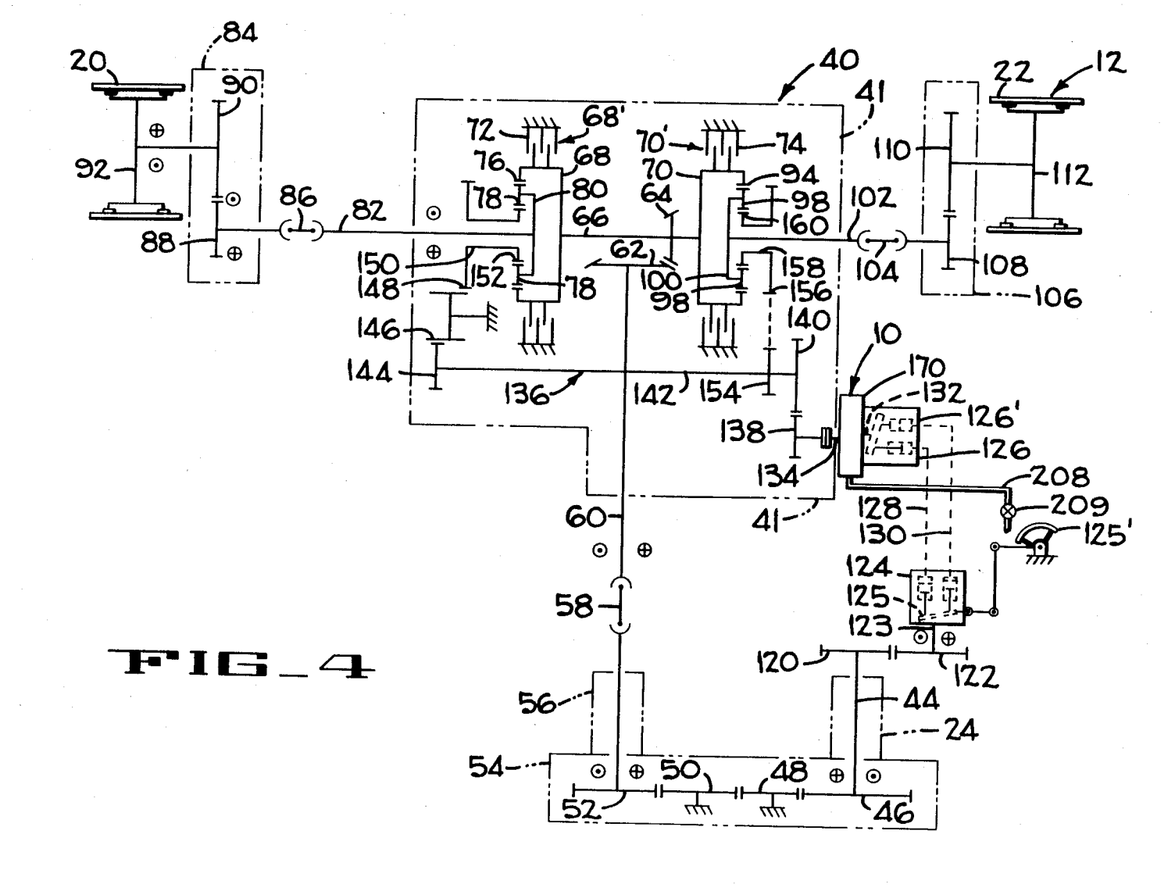
FIG. 4 is a schematic of a power train diagram illustrating a preferred prior art steering transmission used by the assignee of the present invention in a track-laying military vehicle, the location of the reaction steering differential of the present invention being inserted therein in heavy lines.

FIG. 4 illustrates the location of the preferred embodiment of the reaction steering differential 10 in a prior art drive train 40 used by the assignees of the present invention in earlier military vehicles.

The drive train 40 and the differential 10 of the present invention are included in the hydrostatic transmission 12. The drive train 40 is partially encased in a housing 41, which housing is shown in dotted lines in FIG.

4. The drive train 40 receives power from the engine 24 which drives a engine crankshaft 44 that transmits power from both ends of the engine. Power from one end of the shaft 44 drives several gears 46,48,50,52 in a transfer box 54. Output from the transfer box 54 drives an automatic transmission 56 having a conventional torque converter and forward and reverse gear sets therein. Power from the transmission 56 is transmitted through a universal joint 58, shaft 60, and bevel gears 62,64 to drive a cross shaft 66. The cross shaft 66 is connected to left and right hand brake drum carriers 68,70 of brakes 68',70' and have friction discs thereon which cooperate with non-rotatable discs 72,74. The brakes 68',70' are operated by the vehicle driver be conventional controls (not shown) to slow or stop the vehicle.

The left brake drum carrier 68 incldes a ring gear 76 which meshes with planetary gears 78 journaled on a carrier 80 that is secured to a shaft 82 connected to a final drive transfer box 84 through two universal joints and drive shaft 86. Gears 88,90 in the transfer box 84 transfers power to a sprocket 92 which drives the left track 20.

The right track 22 is driven in a similar manner from a ring gear 94 on the right brake drum carrier 70, planetary gears 98, carrier 100, shaft 102, two universal joints and drive shaft 104 and transfer box 106. Gears 108,110 in the right transfer box 106 transfers power to a sprocket 112 which drives the right track 22.

Power for steering the vehicle is transmitted from the other end of the engine shaft 44 through gears 120,122 to the input shaft 123 of an adjustable swash plate hydrostatic pump 124 of well known standard design. The angle of the swash plate 125 is controlled by the vehicle operator by conventional means such as a steering wheel 125'. Hydrostatic fluid is directed between the pump 124 and a hydrostatic swash plate motor 126 of well known design through two conduits 128,130 with the high pressure conduit and return conduit being determined by the position of the steering wheel (and thus the swash plate 125) thereby selectively driving the output shaft 132 of the motor 126 in opposite directions to steer the vehicle to the right or to the left as desired.

In the prior art drive train, power from the output shaft 132 (input of differential 10) is transmitted directly to an input shaft 134 (output of the differential 10) of a steering gear train 136. The input shaft 134 of the steering drive train 136 drives a gear 138 which transmitts power to a drive gear 140 secured to a transverse shaft 142. A left steering gear 144 on the shaft 142 drives a direction reversing idler gear 146 that meshes with an external ring gear 148 secured to a carrier 150. A second external ring gear 152 of the carrier meshes with the planetary gears 78. The right side of the transverse shaft 142 has a right steering gear 154 keyed thereto which meshes with an external ring gear 156, which ring gear is out of the plane of FIG. 4 as indicated by dotted lines. The ring gear 156 is formed on a carrier 158 having a second external ring gear 160 thereon which meshes with the planetary gears 98.

It will be appreciated that during steering of the vehicle, reversing gear 146 will impart torque tending to drive the left and right tracks equal amounts in opposite directions.

If the brakes 68',70' are locked, power from the hydrostatic pump 124 and motor 126 will drive the right and left tracks 20,22 (FIGS. 1 and 4) in opposite directions at the same speed thus pivoting the vehicle chassis 18 about a substantially vertical axis provided no obstructions are contacted by the vehicle 14. More particularly, if the brakes are locked thus holding the brake drum carriers 68,70 and their respective ring gears 76,94 stationary; it is apparent when the hydrostatic motor 126 is controlled to rotate the shaft 142 in one direction, this rotation will cause the planetary gears to walk around the stationary ring gear 76 thus driving the carrier 80 and shaft 82 in one direction. Rotation of the shaft 82 drives the left track in one direction through the previously described transmission components. Since the gear 154 meshes directly with the ring gear 156, it is apparent that the planetary gears 98 will walk around the ring gear in the opposite direction and accordingly will drive the right track 22 an equal amount but in opposite directions relative to the left track 20.

Several rotatable members in FIG. 4 are bracketed with a circle with a dot therein, and a circle with a cross therein. These symbols represent direction of rotation arrows for the several components when the vehicle is driven in a forward direction. The circles having dots therein indicate that the adjacent side of the rotatable element is rotating away from the plane of the paper.

It is apparent that slow and very precise steering of the vehicle 10 is required to accurately aim the gun at a stationary or moving target that is a substantial distance from the casemate vehicle 14. It is also apparent that when the hydrostatic motor 126 is directly connected to the input shaft 134 of the steering drive train 136 as in the prior art device, i.e., without the steering differential 10 interposed therebetween, that the hydrostatic motor 126 must be driven very slowly for aiming the gun. However, the characteristics of the motor 126 at such slow speeds, i.e., below about 40 rpm, do not provide a smooth output but instead provide a jerky, imprecise rotation of the output shaft. This jerky imprecise movement (known as cogging in the art) makes it very difficult to obtain low speed precise azimuth steering and accordingly result in imprecise aiming of the gun. In order to obtain precise aiming of the gun, the steering differential 10 of the present invention is inserted between the output shaft 132 of the hydrostatic motor 126 and the input shaft 134 of the steering drive train 136. The steering differential 10 is designed to prevent steering and accordingly rotation of the steering input shaft 134 until the hydrodynamic motor is rotating at least about 50 rpm thus providing a smooth even drive to the steering drive train resulting in precise low speed steering of the vehicle.

Figure 2:
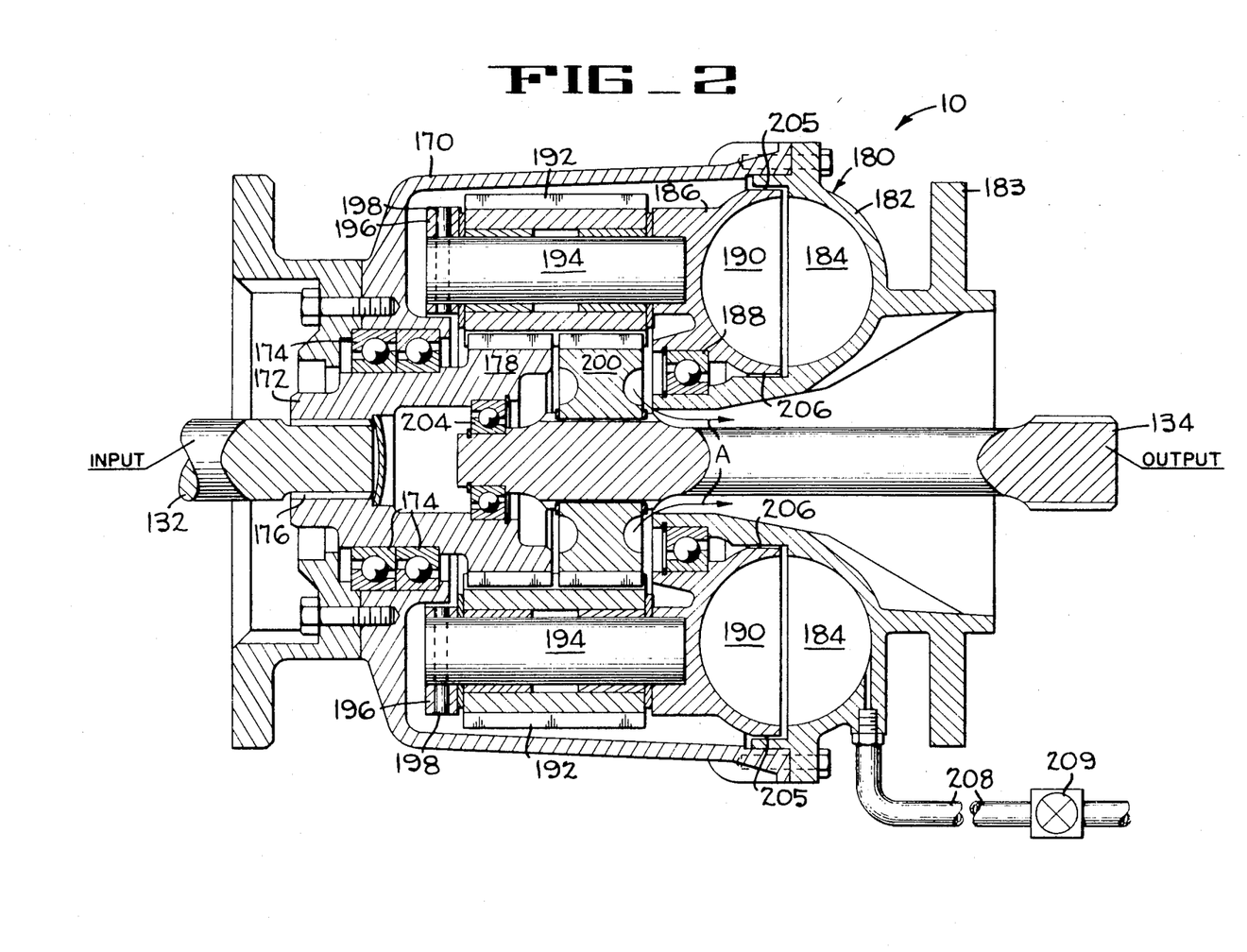
FIG. 2 is a central section of the preferred reaction steering differential.

Having reference to FIG. 2 (and FIG. 3 which is a power train diagram of FIG. 2) the steering differential 10 comprises a housing 170 having a tubular input shaft 172 journaled in the housing by bearings 174. Internal splines 176 are formed near one end for drivingly receiving the shaft 132, and a 36-toothed input sun gear 178 is formed on the other end. A hydrodynamic reaction torque coupling 180 includes a stationary annular portion 182 bolted to the housing 170 and has a plurality of semi-circular stationary coupling blades 184 therein. The stationary portion 182 of the coupling is sealed in fluid tight engagement with the housing 170 and includes a mounting flange 183. An annular rotatable portion or rotor 186 of the coupling 180 is journaled by a bearing 188 to the stationary portion 182 and includes a plurality of semi circular coupling blades 190 that are secured to the rotatable annular portion 186.

Figure 3:
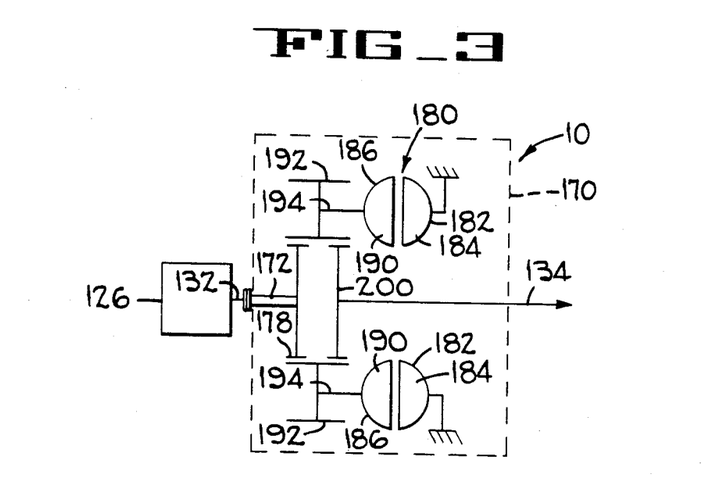
FIG. 3 is a power train diagram of the steering differential of FIG. 2.

The rotor 186 has a plurality of cut-out portions which receive a plurality of 21-tooth planetary gears 192 (only two being shown) which are journaled on evenly spaced pins 194. The outer ends of the pins 194 are connected to a ring 196 that is an integral part of the coupling portion 186 by roll pins 198 or the like. The planet gears 192 are driven by the input sun gear 178 and drive a 33-tooth long addendum output sun gear 200, that is splined to the output steering shaft 134. The inner end of the shaft 134 is journaled to the tubular shaft 172 by a bearing 204 which is held in place by snap rings.

The steering differential housing flange 183 is bolted to the housing 41 (FIG. 4) of the hydrostatic transmission 12, and the housing 170 is bolted in fluid tight engagement to the housing 126' of the hydrostatic motor 126. The hydrodynamic torque coupling 180 is preferably maintained full of relatively low pressure hydraulic fluid. A certain amount of fluid is urged by centrifugal force through an outer annular gap 205 and lubricates the gears in the steering differential 10 before flowing out of the differential 10 along the path indicated by arrows A (FIG. 2) and into the housing 41 (FIG. 4) of the drive train 40 for cooling in a conventional manner. Air tends to flow into the coupling 180 past the bearing 188 and through a second annular gap 206.

it is sometimes desirable to operate the coupling 180 when partially filled with liquid thereby increasing the slip characteristics of the coupling. Increasing the coupling slippage reduces the steering sensitivity for more accuracy in steering the vehicle when on slippery surfaces or when aiming the gun. In order to control the volume of fluid in the hydrodynamic reaction torque coupling 180 from the operator's station, a fluid supply conduit 208 is connected between the coupling 180 (FIGS. 2 and 4) and a conventional source of hydraulic fluid under pressure. The fluid feed conduit 208 has a control valve 209 therein which may be adjusted by the operator to provide a flow rate into the coupling which is substantially equal to the fluid leakage out of the coupling 180 through the annular gap 205 thereby providing operator controlled means for varying the steering sensitivity of the steering differential 10.

It will be understood that at low rotational speeds of the rotor 186 of the hydrodynamic torque coupling 180 relative to the stationary portion 182, said torque coupling will absorb little reaction torque. It will also be understood that as the speed of rotor 186 increases, the reaction torque resists rotation of the rotor 186 and thus applies sufficient driving torque to the input shaft 134 of the drive train (output of the differential 10) to operate the steering power train. It has been determined that a reaction torque of about 3200 pound-inches is necessary for steering the casemate vehicle 14 when the brake 68' and 70' are locked and the gun 28 is being aimed at a target. Such torque will be transmitted to the shaft 134 through the gears 178,192 and 200 when the hydrostatic motor output shaft 132 is driven about 60 or more revolutions per minute.

Figure 5:
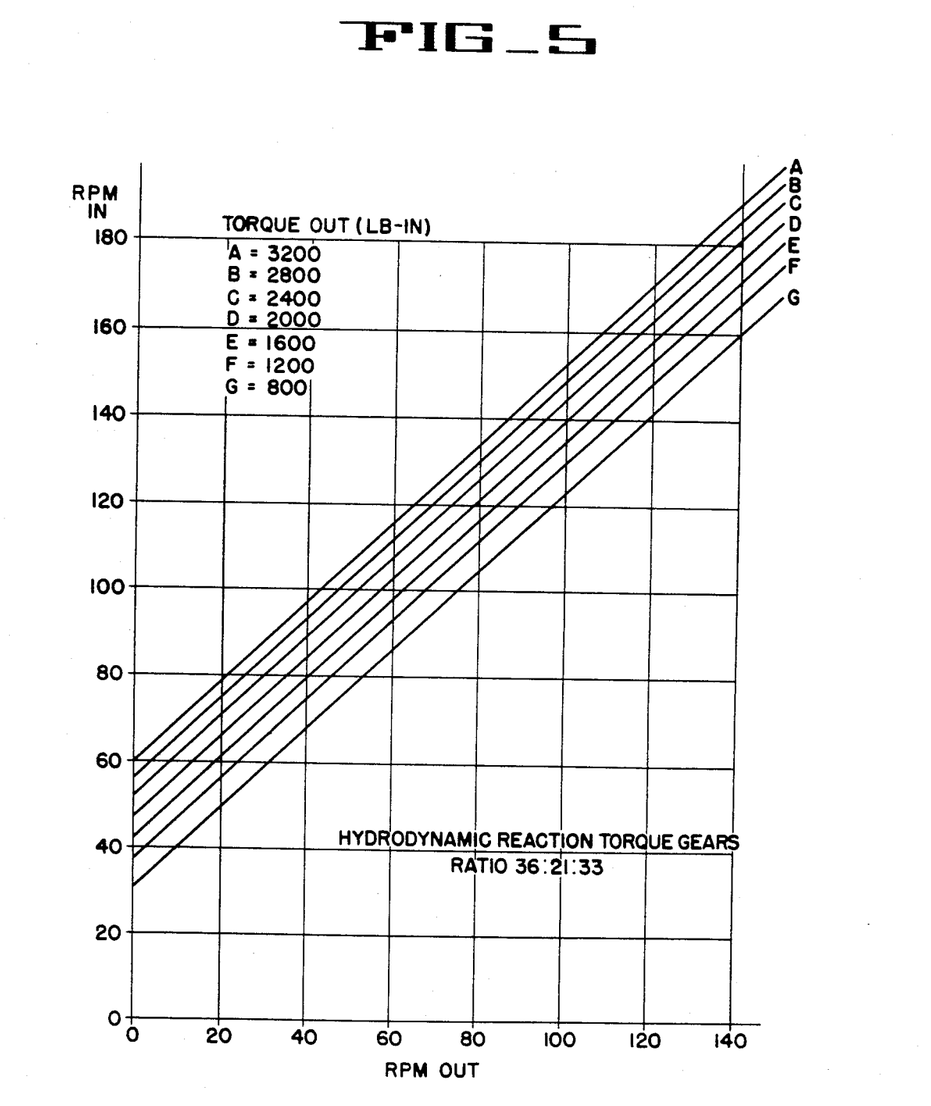
FIG. 5 is a graph illustrating several torque curves of the preferred embodiment of the hydrostatic steering differential based on differential input and output speeds.

FIG. 5 is a graph illustrating the input and resulting output speeds of the hydrostatic reaction steering differential 10 in revolutions per minute for output torques between 3200 pound-inches and 800 pound inches when the differential gear ratio is 36:21:33 used in the preferred embodiment of the steering differential 10 of the present invention. Curve A represents the 3200 pound-inch torque required during gun laying by steering the vehicle in place about a substantially vertical axis. Curves B-G indicate that the vehicle 14 may be steered by application of much lower ranges of steering torques and a lower range of speeds of a steering differential 10 and hydrostatic motor 126 thus minimizing the energy required for steering when traveling along roads or the like.

Figure 6:
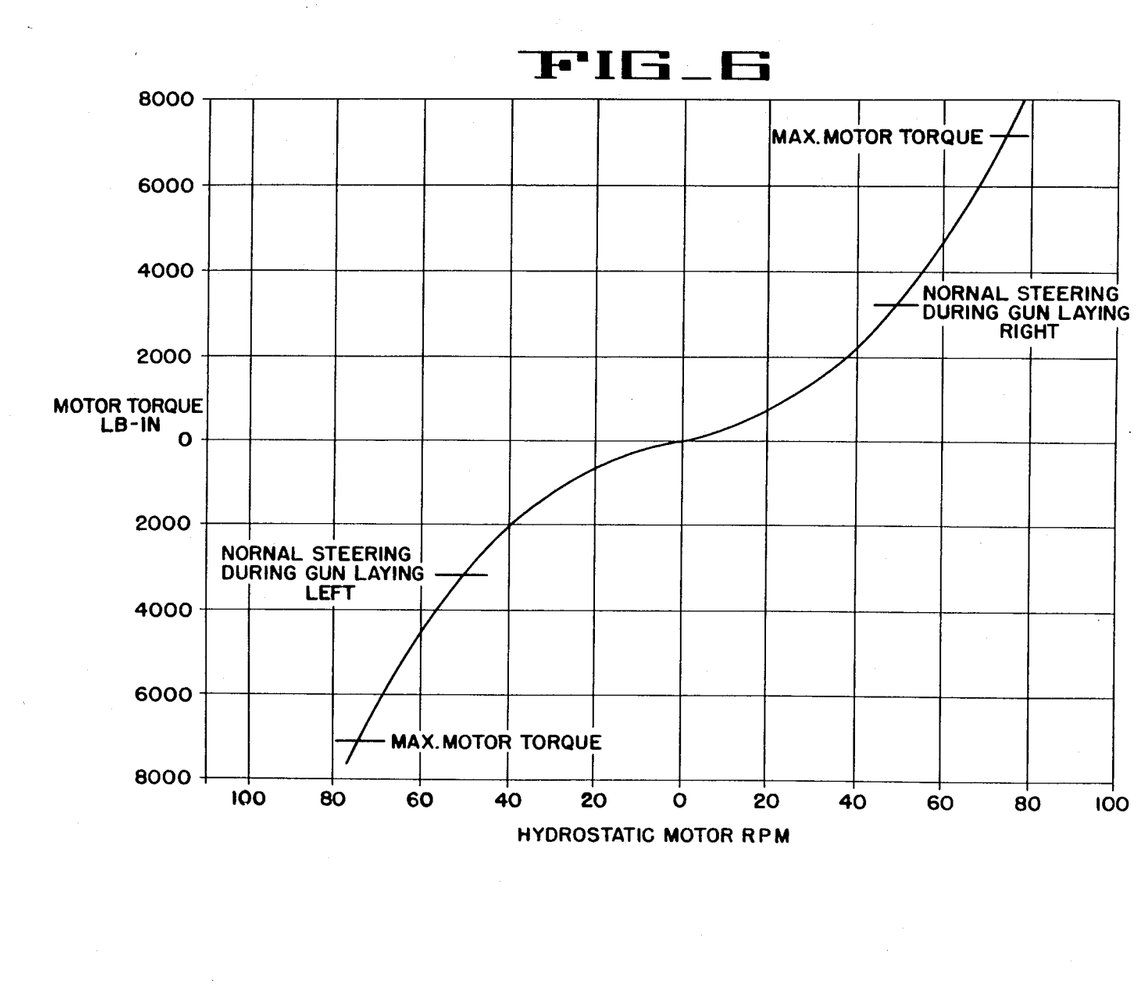
FIG. 6 is a graph illustrating the torque at different output speeds of the differential in the slow speed range.

The graph of FIG. 6 indicates minimum or normal steering torque and speed of the output shaft 134 of the hydrostatic reaction differential 10 during gun laying. The graph also indicates maximum motor and differential steering torque loads at low speed which may be required if the casemate vehicle 14 is being turned in place and engages an obstruction such as trees or a bank of rocks or the like.

Figure 7:
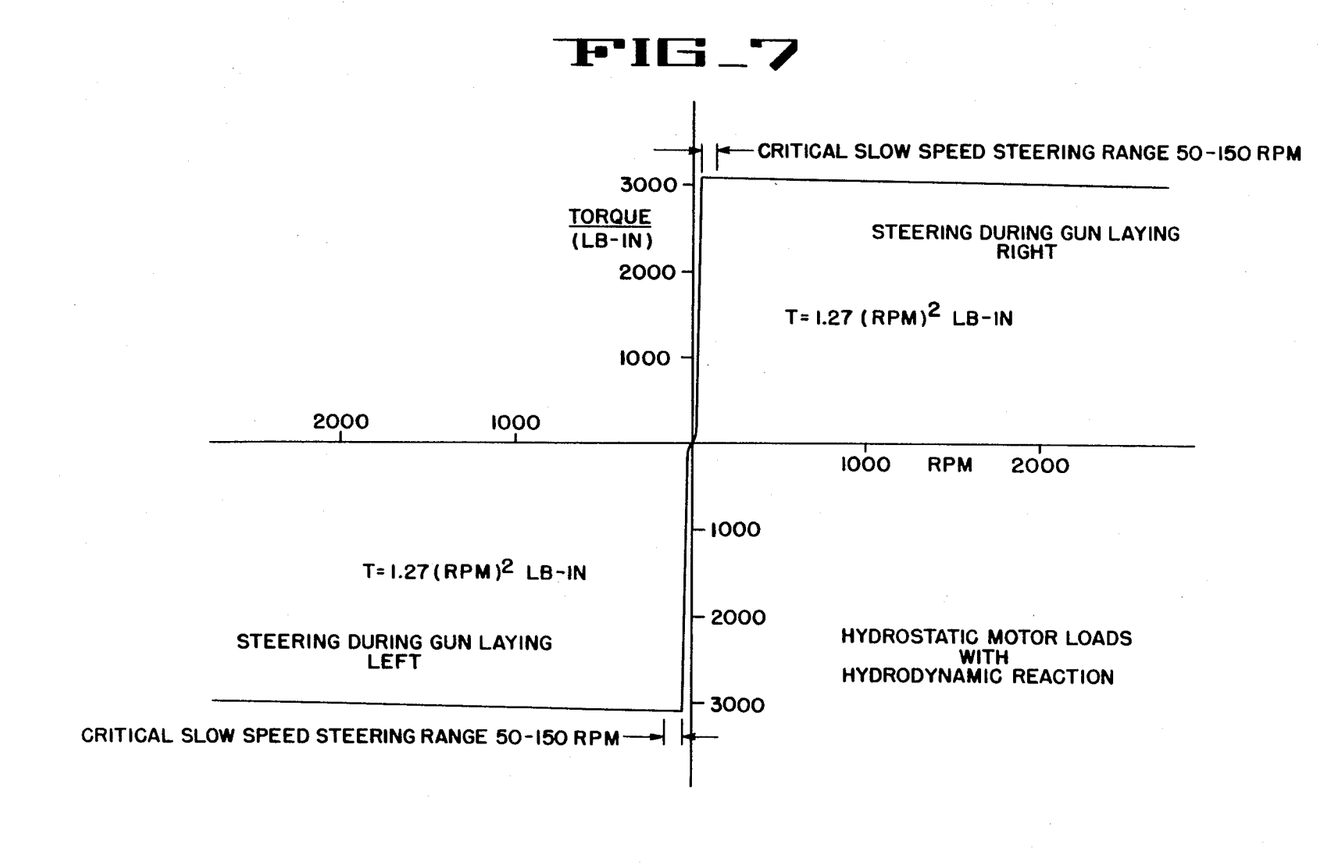
FIG. 7 is similar to FIG. 6 but illustrates the relatively flat torque curves throughout its steering speed range during gun laying.

The graph of FIG. 7 is similar to FIG. 6 but taken at a larger scale to indicate the substantially vertical output speed curve of the hydrostatic reaction differential until the approximately 3200 pound-inch normal steering torque is reached and the substantially constant torque required with output speeds of the differential in the range of about 50 to 2500 rpm. Tests have indicated that this substantially constant torque is maintained for slow or fast turn rates when the vehicle is being turned in place and supported on asphalt, loose ground, or hard ground. However, if obstructions are encountered during gun laying, the torque may raise to about 7000 pound-inches as indicated in FIG. 6.

Minimum gun laying standards for turret mounted vehicles require that the minimum rate during gun laying be at least 0.5 mil per second for tracking a target. The reaction steering differential when used in the casemate vehicle 14 and when incorporated in the hydrostatic transmission 12 illustrated in FIG. 4 is capable of precise azimuth steering in a speed range having its lower speed less than 0.5 mil per second. As diagrammatically illustrated in FIG. 4, the turning is controlled by an operator by conventional means such as a steering wheel 125' operatively connected to the swash plate 125 of the variable speed hydrostatic pump 124. When the operator maintains the swash plate 125 perpendicular to the shaft 123 by centering the steering wheel 125', the pistons of the pump do not reciprocate and accordingly no steering forces are applied to the motor 126. When the operator turns the steering wheel 125' in one direction to angle the swash plate 125 relative to the shaft 123 as illustrated in FIG. 4, hydraulic fluid will be directed to the cylinders in the motors 126 thereby turning the vehicle in one direction; whereas turning the steering wheel and swash plate in the opposite direction will provide power to turn the vehicle in the opposite direction.

Figure 8:
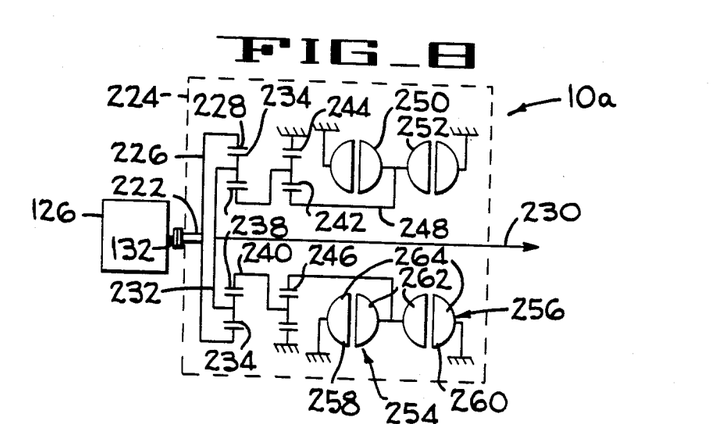
FIG. 8 is a power train diagram of a second embodiment of the steering differential of the present invention.

A second embodiment of the reaction steering differential 10a is illustrated in FIG. 8 in a power train diagram similar to the power train diagram of the first embodiment as disclosed in FIG. 3. The differential 10a, when used as a steering differential for the casemate vehicle 14 (FIG. 1) is substituted in the transmission 12 (FIG. 4) in place of the differential 10. All other portions of the transmission 12 and its operation are substantially the same as described above.

The steering differential 10a (FIG. 8) receives its power from the output shaft 132 of the hydrostatic motor 126. The output shaft 132 is coupled to a tubular input shaft 222 journaled in a housing 224 having a carrier 226 and a 59-tooth internal ring gear 228 formed thereon. An output shaft 230 is journaled in the housing 224 and has a planet gear carrier 232 splined thereto. A first set of 19 tooth planet gears 234 are journaled on the carrier 232 and mesh with the internal ring gear 228 and with a 21-tooth external ring gear 238 formed on a second carrier 240 having a second set of 19 tooth planet gears 242 journaled thereon. The second set of planet gears 242 mesh with a 59-tooth internal ring gear 244 secured to the housing 224, and to a 21-tooth external ring gear 246 formed on a tubular carrier 248 to which the rotatable halves 250,252 of the hydrodynamic reaction torque couplings 254,256 are secured. Stationary portions 258,260 of the coupling 254,256 are secured to the housing 224. The rotatable and stationary coupling halves include vanes 262,264, respectively; and the couplings are filled with hydraulic fluid as in the first embodiment of the invention.

As in the first embodiment, the fluid coupling 254,256 operates as a speed sensitive brake which allows the rotatable coupling halves 250,252 to rotate with little resistance at slow speeds, but restrict rotation at higher speeds. Thus, when the reaction torque within the couplings 254,256 multiplied by the gearing reaches about 3200 pound-inches, the casemate vehicle 14 may be turned in place for aiming the gun as previously described in the first embodiment of the invention.

Figure 9:
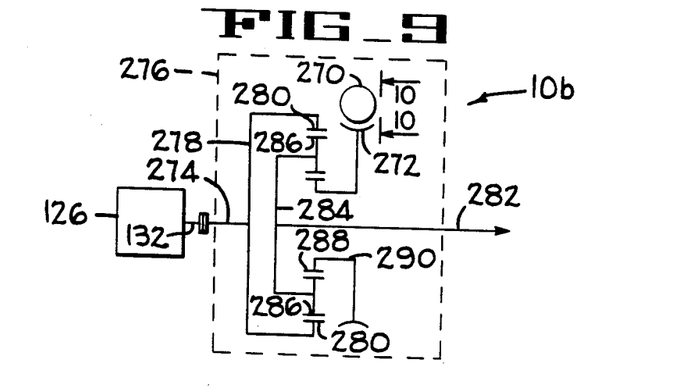
FIG. 9 is a power train diagram of a third embodiment of the steering differential of the present invention.
Figure 10:
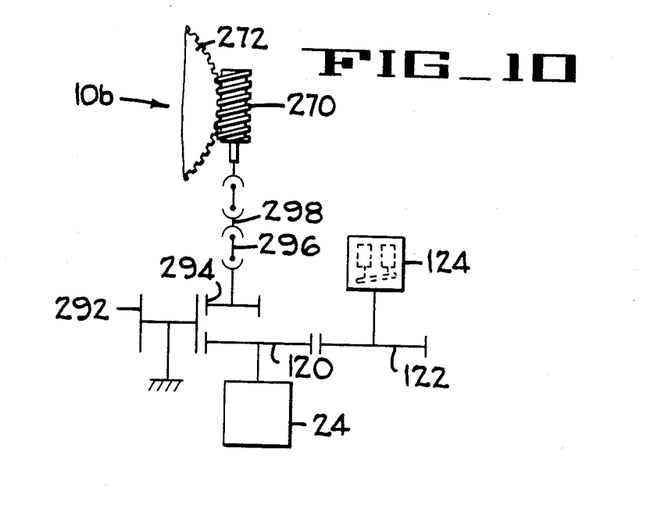
FIG. 10 is a section taken along lines 10—10 of FIG. 9 illustrating the worm wheel drive.

A third embodiment of the reaction steering differential 10b of the present invention is diagrammatically illustrated in FIGS. 9 and 10 and is intended to be substituted in the transmission of FIG. 4 for the differential 10. The differential 10b differs from the other two embodiments in that the reaction torque is provided by a positively driven worm gear 270 and a 55-tooth worm wheel 272 rather than a hydrostatic coupling which functions as a fluid brake as in the other two embodiments.

The differential 10b includes an input shaft 274 journaled in a housing 276 and coupled to the output shaft 132 of the hydrostatic motor 126. The shaft 274 is integrally formed with a carrier 278 having a 51-tooth internal ring gear 280 formed thereon. An output shaft 282 is journaled in the housing 276 and is coupled to the input shaft 134 (FIG. 4) of the transmission 12. A planetary gear carrier 284 is secured to the output shaft 282 and has a plurality of 15-tooth planet gears 286 journaled thereon and meshing with the ring gear 280 and a 21-tooth sun gear 288. The sun gear 288 and worm wheel 272 are supported by a worm wheel carrier 290 journaled in the housing 276.

Figure 11:
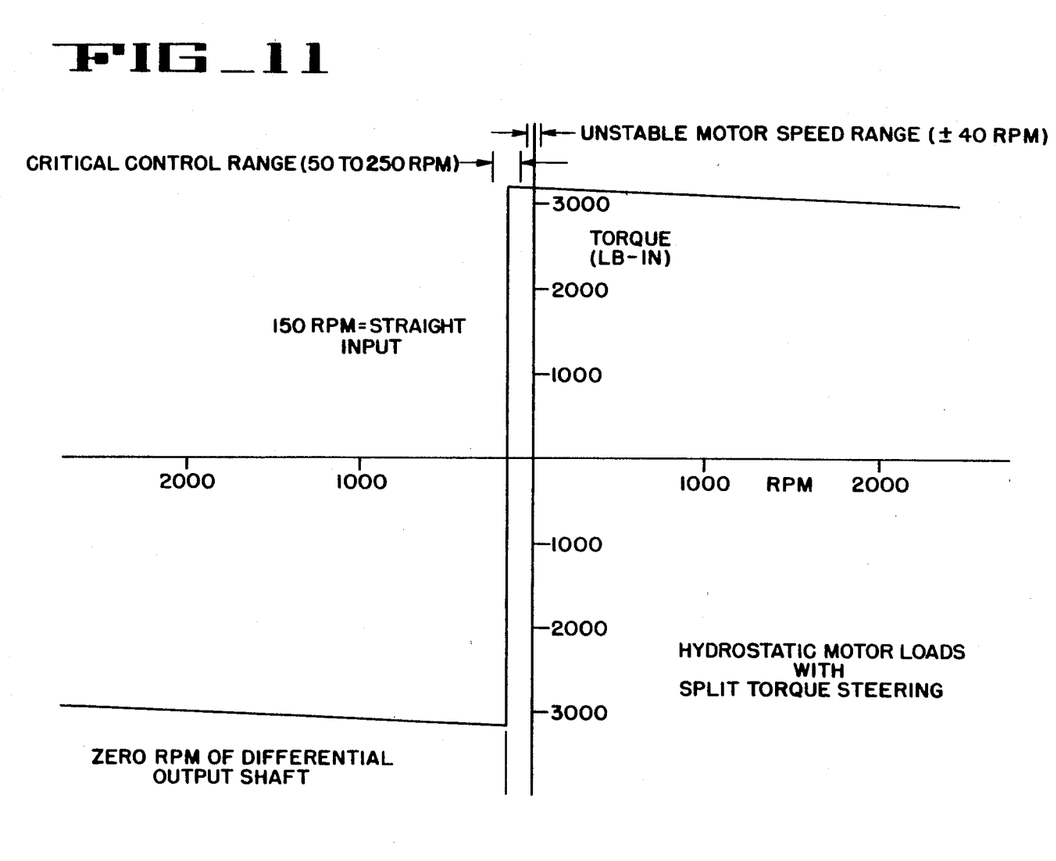
FIG. 11 is a graph similar to FIG. 8 but illustrating the operating characteristics of the reaction differential of the third embodiment of the invention.

As mentioned above, the worm gear 270 is positively driven. The engine 24 (FIGS. 4 and 10) drives the hydrostatic pump 124 through gears 120,122. A pinion 292 meshes with gear 120 and a gear 294 that is connected to the worm gear 270 by universal joints 296 and a drive shaft 298. The gear ratios are designed so that the worm wheel 272 will be driven at a constant speed in one direction and the hydraulic motor 126 must be driven at about 150 rpm in the opposite direction to provide a zero speed of the output shaft 282 and thus no steering. Thus, as indicated in the graph of FIG. 11, in order to turn the vehicle in one direction in the critical gun laying range, the hydraulic motor 126 must be driven at the rate of 50 to 150 rpm; while steering in the critical range in the opposite direction, the required motor speeds are between about 150 to 250 rpm. Both of these critical gun laying ranges lie outside of the unstable motor speed range of about 40 rpm.

Although three embodiments of the hydrostatic reaction transmission of the present invention have been described in connection with the preferred use of the transmission, i.e., precise steering of a casemate vehicle at slow speeds required for precise gun laying; it will be understood that the reaction torque differentials may be used for other purposes and may be driven by other power means. For example, the reaction torque differentials may be used for no load starts, and may be used as means to reduce input speeds and power requirements when torque requirements vary considerably, such as indicated in FIG. 5 which shows that considerable energy is required for steering when gun laying, but very little energy is required for steering when driving the vehicle at normal speeds.

From the foregoing description it is apparent that the apparatus of the present invention provides a steering transmission capable of precisely steering a vehicle at very low steering speeds as required for aiming a gun in azimuth. The reaction differentials serve to reduce starting loads and to cause the differential drive means to operate at higher rpms and therefore providing smoother output drive ranges of the differential as compared to such ranges when the power means is operating at lower rpms.

Although the best mode contemplated for carrying out the present invention has been herein shown and described, it will be apparent that modification and variation may be made without departing from what is regarded to be the subject matter of the invention.

What is claimed is:

1. A reaction differential comprising a housing; means defining an input shaft journaled in said housing; means defining an output shaft journaled within said housing; differential means within said housing including a planetary gear train having an input portion operatively connected to said input shaft and an output portion operatively connected to said output shaft, said differential means including a rotor movable around an input sun gear and an output sun gear; torque reaction means within said housing including a plurality of stationary coupling blades secured to said housing and a plurality of rotatable coupling blades secured to said rotor closely adjacent said stationary blades and operatively connected to said output portion of said planetary gear train; input power means for driving said input shaft; means for directing hydraulic fluid into said torque reaction means for engagement with said coupling blades; said rotatable coupling blades rotating relative to said stationary blades for preventing rotation of said output portion in a predetermined direction until the rate of rotation of the input shaft reaches a desired velocity, and thereafter said fluid in said torque reaction means applying a sufficient reaction torque against said rotatable coupling blades for progressively minimizing differential action and to progressively increase the speed of said output shaft.

* * * * *